United States Patent [19]

Sobczyk

[11] 4,331,351
[45] May 25, 1982

[54] MOUNTING ARRANGEMENT FOR A SUCTION NIPPLE ON A VACUUM CLEANER

[75] Inventor: Erhard Sobczyk, Schwelm, Fed. Rep. of Germany

[73] Assignee: Vorwerk & Co. Interholding GmbH, Wuppertal, Fed. Rep. of Germany

[21] Appl. No.: 157,646

[22] Filed: Jun. 6, 1980

[30] Foreign Application Priority Data

Jun. 19, 1979 [DE] Fed. Rep. of Germany ... 7917533[U]

[51] Int. Cl.³ .............................................. F16L 00/00
[52] U.S. Cl. ....................................... 285/7; 285/110; 285/275
[58] Field of Search ................... 285/7, 110, 98, 275, 285/276, 281; 15/300 R

[56] References Cited

U.S. PATENT DOCUMENTS

| | | | |
|---|---|---|---|
| 2,703,720 | 3/1955 | Warren | 285/276 |
| 2,884,264 | 4/1959 | Takeuchi | 285/110 |
| 3,341,228 | 9/1967 | Miller | 285/110 X |
| 3,565,464 | 2/1971 | Wolf | 285/7 |
| 4,113,288 | 9/1978 | Cox | 285/276 |
| 4,211,438 | 7/1980 | Asberg | 285/7 |

FOREIGN PATENT DOCUMENTS 575629  2/1946  United Kingdom ................. 285/98

Primary Examiner—Dave W. Arola
Attorney, Agent, or Firm—Michael J. Striker

[57] ABSTRACT

A mounting arrangement of a suction nipple on a vacuum cleaner includes an elongated portion of the suction nipple inserted into an opening formed in a housing of the vacuum cleaner. The elongated portion is provided with two vertically spaced bearing surfaces arranged in contact with the housing and forming a clearance in an area therebetween. A lower end of the elongated portion is supported by an elastic sealing ring. The elastic ring is formed with projections extending into the grooves made in the housing to seal the mounting arrangement.

4 Claims, 2 Drawing Figures

MOUNTING ARRANGEMENT FOR A SUCTION NIPPLE ON A VACUUM CLEANER

BACKGROUND OF THE INVENTION

The invention relates to vacuum cleaners and more particularly to mounting arrangements for a suction nipple on a housing of the vacuum cleaner.

In the known arrangements of the foregoing type a nipple is normally turnably mounted in an opening provided in the housing and is inserted into the housing with a lower end thereof. In this mounting arrangement a circlip which is usually arranged in a groove provided on a nipple pipe of the nipple holds the latter in a snapping relationship with the housing.

In the known arrangements a number of grooves are formed to receive sealing rings which may be made of felt or any other similar material. These sealing rings provide a sealing between the suction nipple and the housing of the vacuum cleaner whereas the circlip prevents the nipple from axial displacement. A disadvantage of this arrangement resides in that any considerably accurate guiding between the end nipple pipe of the nipple and the housing of the vacuum cleaner can not been obtained and the sealing rings installed into the grooves can be easily inclined or thrown off during operation.

SUMMARY OF THE INVENTION

It is therefore an object of the invention to overcome the disadvantages of the prior art arrangements.

Another object of the invention is to provide an improved mounting arrangement for the suction nipple on the housing of the vacuum cleaner in which a supporting function and a sealing function are combined.

Still another object of the invention is to provide a mounting arrangement in which accurate guiding ways between the nipple and the housing are provided.

These and other objects of the invention are attained by the mounting arrangement for a suction nipple on a vacuum cleaner having a housing with an elongated opening to receive an end pipe of the nipple which has an elongated portion extending into the opening, comprising supporting means to hold the end pipe in the opening and sealing means arranged between the elongated portion of the end pipe and the housing. The supporting means including a first bearing surface on the elongated portion arranged in contact with the housing and a second bearing surface on said elongated portion also arranged in contact with said housing. The first bearing surface is vertically spaced from the second bearing surface to form a clearance between the elongated portion and the housing in an area between said bearing surfaces to provide a guide way between the end pipe and the housing and simultaneously permit a slight turnable movement between the elongated portion and the housing.

The sealing means may include an elastic annular ring mounted on a lower end of said elongated portion.

The annular ring may further include a circular lip projecting into a circular groove provided in the housing.

The lip and the groove may each have a V-shape respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1:
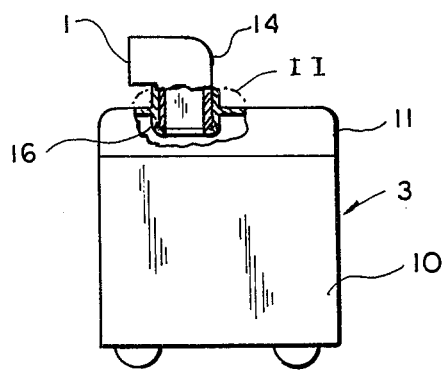
FIG. 1 is a side elevational view of a vacuum cleaner with a sectional portion showing a mounting arrangement according to the invention.
Figure 2:
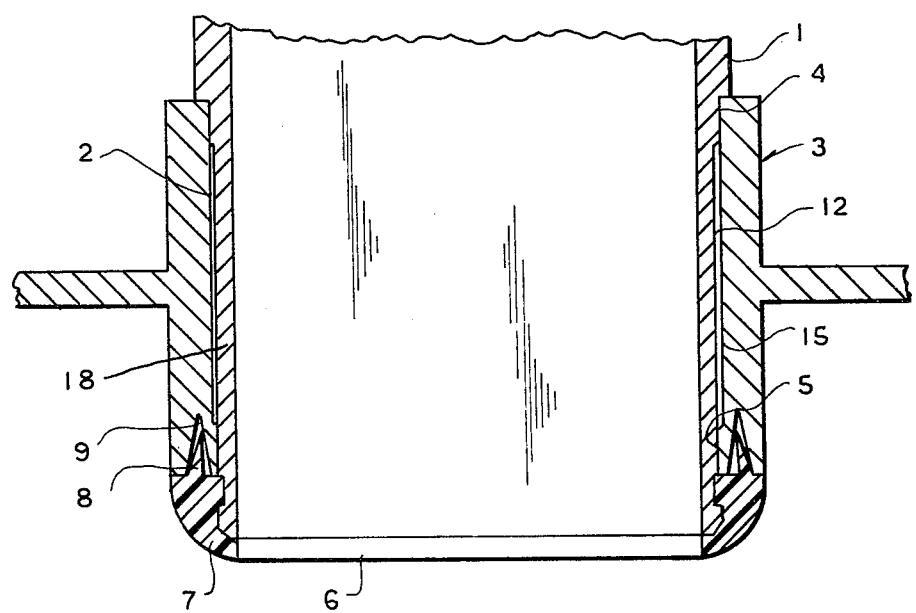
FIG. 2 is an enlarged sectional elevational view of the mounting arrangement shown by II in FIG. 1.

A vacuum cleaner generally designated as 3 includes a lower part 10 and an upper part 11 which is hinged thereon. The upper portion 11 carries a turnably mounted nipple 1 which is formed with an end feed pipe 14 having an elongated portion 2 inserted into an opening 15. The opening 15 is provided in a projection 16 formed in the housing 3. The elongated portion 2 is formed with a narrowing intermediate part 18 which constitutes a first bearing surface 4 and a second bearing surface 5 which are arranged in contact with the housing 3. The bearing surfaces 4 and 5 are vertically spaced from each other to form a clearance 12 therebetween. In such structure two-point bearing track provides a reliable guide of the end pipe within the housing 3 and therefore a tilting movement of the end pipe is prevented. This structure also decreases friction forces which may occur in the mounting arrangement in operation of the vacuum cleaner because a slidable turnable movement of the elongated portion 2 is still permitted in the arrangement.

A lower end 6 of the nipple 1 is supported by means of an elastic supporting ring 7 which is clipped on the lower end of the elongated portion 2. The projection 16 of the housing 3 is formed with a V-shaped circular groove 9 into which a V-shaped circular lip 8 integrally formed with the ring 7 is extended. The elastic ring 7 thus seals the turnable connection described herein. The sealing function will be obtained when the circular lip 8 will have a diameter smaller than that of the circular groove 9. The circular lip 8 is thereby is beared against the circular groove 9. The elastic supporting ring 7 thus not only supports the nipple 1 in the housing 3 but also serves as a sealing means in the mounting arrangement. The elastic ring 7 may be made of any conventional elastic suitable material.

It will be understood that each of the elements described above, or two or more together, may also find a useful application in other types of mounting arrangement differing from the types described above.

While the invention has been illustrated and described as embodied in a mounting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A mounting arrangement of a suction nipple on a vacuum cleaner comprising: a vacuum cleaner housing having an opening therein, said opening being defined by an elongated projection having a first and a second end; a suction nipple having an elongated portion extending through said elongated projection, the arrangement comprising means for supporting said elongated portion in said opening, including a first bearing surface on said elongated portion arranged in contact with said first end of said elongated projection and a second bearing surface on said elongated portion arranged in contact with said second end of said elongated projection, said first bearing surface being vertically spaced from said second bearing surface and said elongated portion and said elongated projection having reduced diameters between said bearing surfaces to form a clearance between said elongated portion and said elongated projection; means adjacent said first bearing surface to limit penetration of said nipple into said opening; and an elastic annular sealing ring means clipped on the end of said elongated portion adjacent said second bearing surface; said elongated projection having groove means in the end adjacent said second bearing surface, said groove means being normal to said second bearing surface, said sealing ring means partially extended into said groove means to thereby hold said elongated portion in said elongated projection and form a seal between said elongated projection and said elongated portion and simultaneously permit a slight turnable movement between said elongated projection and said elongated portion.

2. The arrangement of claim 1, wherein said annular sealing ring means further includes a circular lip and said groove means in said elongated projection is formed with a corresponding circular groove, said circular lip projecting into said groove.

3. The arrangement of claim 2, wherein said lip and said groove each have a V-shape respectively.

4. The arrangement of claim 3, wherein said circular lip has an unstressed diameter smaller than that of said circular groove.

* * * * *